Oct. 18, 1960 T. A. RICH 2,956,435
CONDENSATION NUCLEI DETECTOR
Filed Jan. 29, 1957
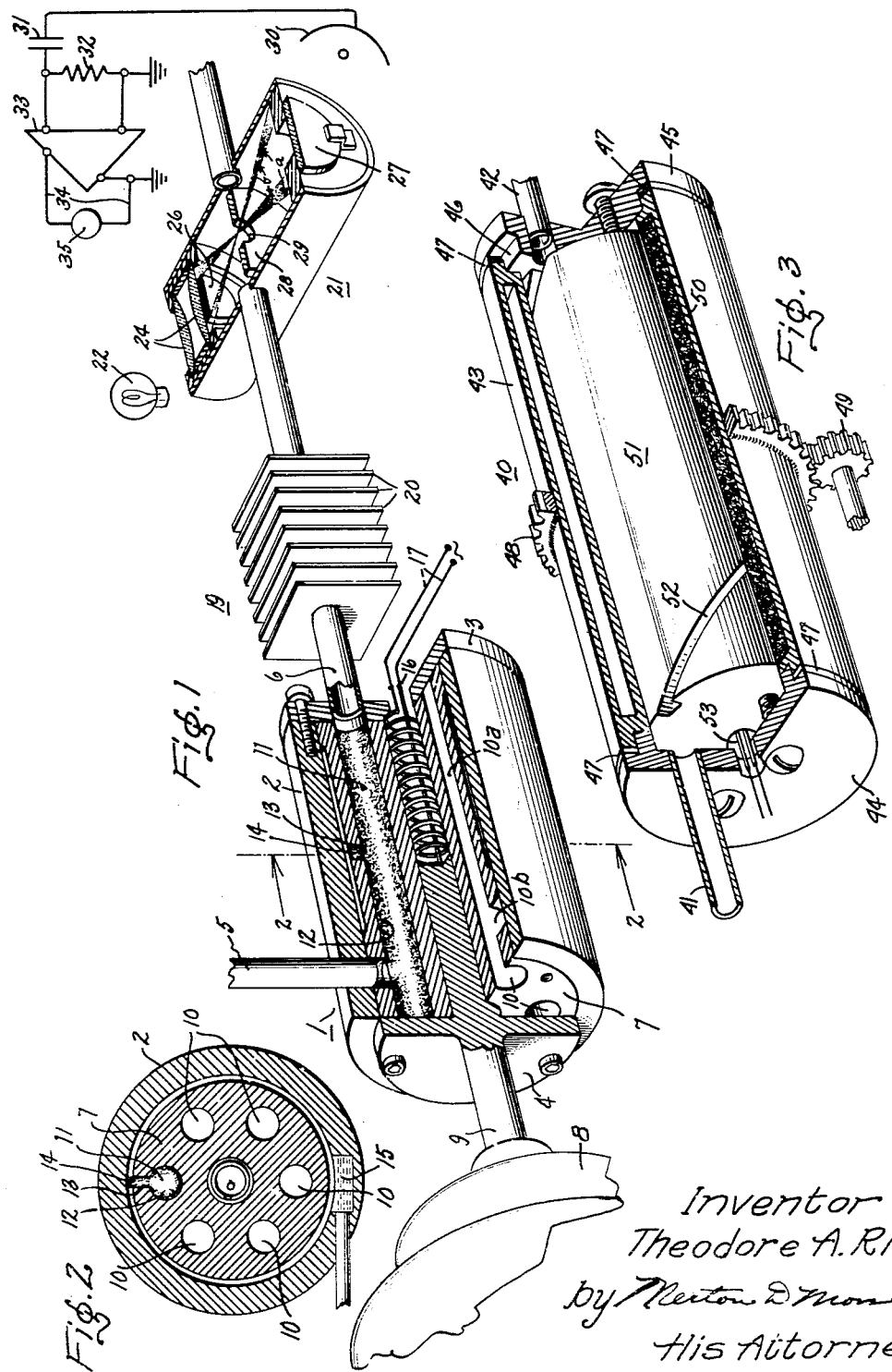
Inventor
Theodore A. Rich
by Newton D. Moore
His Attorney United States Patent Office 2,956,435
Patented Oct. 18, 1960

2,956,435
CONDENSATION NUCLEI DETECTOR

Theodore A. Rich, Scotia, N.Y., assignor to General Electric Company, a corporation of New York Filed Jan. 29, 1957, Ser. No. 637,047

9 Claims. (Cl. 73—432)

This invention relates to an apparatus for measuring condensation nuclei. Additionally, this invention relates to a humidifying apparatus adapted to bring selected portions of a nuclei bearing gaseous medium to a saturated condition.

Condensation nuclei is a generic name given to small particles which are characterized by the fact that they serve as the nuclei on which a fluid, such as water for example, condenses to form droplet clouds. Condensation nuclei, as this term is understood in the art, encompasses particles ranging in size from $1 \times 10^{-4}$ cm. radius to $1 \times 10^{-8}$ cm. radius, although the most significant portion, numerically, of this range lies between $5 \times 10^{-5}$ and $5 \times 10^{-7}$ cm. radius.

In view of the accelerated interest in condensation nuclei during the past few years a great need exists for accurate yet simple instruments for measuring these nuclei. That is, in recent years extensive investigations into condensation nuclei, their composition, behavior, etc. have shown that condensation nuclei may provide a very simple yet accurate index of conditions in many technological and scientific areas. Thus, for example, accurate information as to the condensation nuclei concentrations are extremely useful in meteorological and atmospheric studies, air pollution studies, and investigations of many common industrial processes. Among the latter especially, it has been found that information relating to the nuclei concentrations may be extremely informative in determining the nature and functioning of many of these processes. Thus, an urgent need exists for accurate and sensitive devices for measuring condensation nuclei.

Due to the minute size of these condensation nuclei problems of great difficulty are encountered in their measurement since particles in the microscopic and sub-microscopic range are involved. As a consequence, the usual techniques involving light absorption and scattering are of little utility since the condensation nuclei per se are small relative to the wave length of visible light and, consequently, no accurate and reproducible result can be achieved. As a result, techniques have been developed for measuring condensation nuclei which rely on their property of acting as the nuclei of a water drop. By causing condensation to take place about the nuclei, their size is increased by many orders of magnitude so that the available techniques may be utilized in measuring.

The mechanism involved in the condensation of water vapor about such nuclei is directly related to the relative humidity of the nuclei bearing gaseous medium. If the humidity of a gaseous medium tends to rise above 100%, as would occur by a sudden cooling, a condition of instability exists and condensation starts the deposition of water on the nuclei present to achieve an equilibrium condition. The deposition of water continues until the humidity is lowered to a new equilibrium condition representing substantially 100% relative humidity for the new temperature. Thus, the cooling of the gaseous medium and the accompanying instantaneous supersaturated condition is the critical element in initiating the condensation triggering mechanism. By controlling the manner and time in which this rapid cooling takes place it is possible to devise an instrument which measures the number of condensation nuclei.

In the past it has been customary to subject the nuclei bearing gaseous medium to an adiabatic expansion in order to achieve the rapid cooling necessary to cause the supersaturation and condensation. Patent No. 2,684,008, issued on July 20, 1954, to Bernard Vonnegut, describes one of the prior art devices wherein the nuclei bearing gaseous medium is periodically subjected to an adiabatic expansion in order to form droplet clouds.

In the Vonnegut device the entire gaseous medium is humidified by passing it through a bubbling humidifier which brings the medium to 100% relative humidity. The humidified gaseous samples are introduced into an expansion chamber by means of a valve arrangement. The samples in the chamber are periodically expanded by means of a reciprocating pump, which sudden expansion cools the air in the chamber. The amount of water vapor in the gaseous medium which was 100% of what could be retained at the former temperature (i.e., 100% relative humidity) will be more than 100% of what can be retained at the cooler temperature. Thus, instantaneously a condition of supersaturation exists within the chamber. As a consequence of this supersaturated condition, water vapor condenses on the condensation nuclei present in the gaseous medium.

The expansion chamber has a beam of radiant energy passing therethrough which is scattered by the periodic droplet cloud and produces a periodic electrical signal in the output of a radiation sensitive device. Since the output signal of the radiation sensitive device is periodic, the utilization of alternating current amplifiers, etc., with their attendant simplicity in circuitry and operating conditions, is possible.

Although utilizing an adiabatic expansion of the gaseous medium is a perfectly adequate method for inducing the rapid cooling necessary for the formation of cloud droplets, it suggests itself, however, that the same effect may be achieved by subjecting the nuclei bearing gaseous medium to a fixed temperature differential. In this manner the rapid cooling necessary for initiation of condensation may be achieved without utilizing an expansion device such as a reciprocating pump.

Furthermore, it is possible to form the droplet clouds periodically, thus producing periodic electrical signals with the attendant simplicity of circuitry and ease of operation, by humidifying only selected portions of the gaseous medium, thus forming periodic droplet clouds.

It is an object of this invention, therefore, to provide an apparatus for detecting condensation nuclei wherein only selected portions of the nuclei bearing gaseous medium are humidified.

Another object of this invention is to provide an apparatus for detecting and measuring condensation nuclei wherein the condensation mechanism is effected by means of a temperature differential applied to said gaseous medium.

Still another object of this invention is to provide a humidifying apparatus which humidifies only selected portions of a nuclei bearing gaseous medium.

Yet another object of this invention is to provide a humidifier apparatus to produce periodic humidified samples wherein selected portions of the gaseous samples are kept in continuous contact with a source of vaporizable material.

Other objects of this invention will become apparent as the description of the invention proceeds.

In accordance with the invention the foregoing objects are accomplished by providing a humidifier through which the nuclei bearing gaseous medium is adapted to pass. The humidifier is so constructed that only a selected portion of the gaseous medium is maintained in contact with a source of vaporizable material and brought to 100% relative humidity. Thus, the gaseous medium issuing from the humidifying means consists alternately of humidified and non-humidified portions. The gaseous medium is then subjected to substantially lower temperature causing condensation about nuclei in the humidified portions while leaving the non-humidified portions unaffected. The gaseous medium is introduced into a chamber traversed by a source of radiant energy. Thus, periodic droplet clouds appear in the optical chamber to produce an electrical signal, the magnitude of which is an index of the number of condensation nuclei present in the gaseous medium.

In one embodiment the humidifier utilized in the instant invention comprises a hollow cylindrical chamber having input and output conduits. A cylindrical member is positioned within the chamber and is continuously rotated. A multiplicity of axially extending passages through the cylindrical member are periodically brought into alignment with the input and output conduits. One of the axially extending passageways contains a source of vaporizable fluid, such as a moist blotter, so that the portion of the gaseous medium passing through this passageway is brought to 100% relative humidity. Since the cylindrical member rotates, different ones of the passageways are sequentially brought into alignment with the conduits and transmit the gaseous medium into the condenser and optical chamber. Since only one of these passages contains a source of vaporizable fluid only the portion of the gaseous medium passing therethrough is humidified whereas the ones passing through the other passages are not. As a consequence, only a selected portion of the gaseous medium flowing through the humidifying means is humidified.

In an alternative embodiment of the humidifier with the instant invention, a hollow rotatable cylindrical member is provided having input and output conduits. The hollow member contains an axially extending groove which contains a source of vaporizable fluid, such as a wet blotter or wicking. A second cylindrical fixed member having a helical groove along the surface thereof is positioned within the hollow member. By rotating the outer cylindrical member at a proper speed the groove filled with the vaporizable material is caused to move along the helical member so that one portion of the gaseous medium passing therethrough is continuously in contact with the source of vaporizable material. Thus, again this humidifying element produces alternate portions of humidified and unhumidified gaseous medium.

The novel features which are believed to be characteristic of my invention are set forth with particularity in the appended claims. My invention itself, however, both as to its organization and method of operation together with further objects and advantages thereof, may best be understood by reference to the following description taken in connection with the accompanying drawing in which:

Figure 1 is a perspective partially in cross section of the novel apparatus of the invention;

Figure 2 is a section taken along the lines 2—2 of Figure 1; and

Figure 3 is a fragmental perspective partially in cross section of an alternative humidifying element which may be utilized with the device of Figure 1.

Referring now to Figure 1, there is shown an embodiment of a condensation nuclei detecting apparatus illustrating the instant invention. There is disclosed an apparatus in which a nuclei bearing gaseous medium is subjected to the action of a humidifying means which brings selected portions of the medium to a saturated condition.

There is provided a humidifying means adapted to have a nuclei bearing gaseous medium flow therethrough in which a selected portion of the gaseous medium is maintained in continuous contact with a source of vaporizable fluid by virtue of the relative movement of the elements of the humidifying means. To this end there is provided a humidifier 1 comprising a stationary hollow cylindrical member 2 having an end plate 3 enclosing one end thereof to form an internal chamber space. An input conduit 5 extends through the cylindrical member 2 into the internal chamber while an output conduit 6 similarly extends into the internal portion through the end plate 3.

Positioned within the hollow chamber portion is a rotating cylindrical member 7 driven by a motor 8 through a connecting shaft 9. The cylindrical member 7 contains a multiplicity of flow-directing passages 10 which, upon the relative rotation of the cylindrical members 2 and 7, causes selected portions of the gaseous medium to be humidified. The flow-directing passages are circumferentially spaced and are constituted of elongated axially extending portion 10a and radially extending connecting portions 10b. A plate 4 is fastened by means of screws or any other similar fastening means to the cylindrical member 7 and encloses one end of the flow-directing passages. The passages 10 are adapted to come into periodic alignment with the input conduits 5 and 6 to permit passage of the gaseous medium therethrough.

One of the passageways is provided with a source of vaporizable fluid which is maintained in continuous contact with the selected portion of the gaseous medium contained within that passageway. In order to achieve this result, a passageway 11 is lined by a liquid absorbent lining member 12, such as a wet blotter or a linen lining, which provides a continuous source of vaporizable fluid to the selected portion of the gaseous medium. A radially extending hole 13 positioned midway along the passageway 11, and seen most clearly with reference to Figure 2, extends between the outer surface of the cylinder 7 and the passageway 11. The hole 13 contains a wicking member 14 and constitutes in conjunction therewith a means for replenishing the supply of vapor to the wet lining 12 in the passage 11. A reservoir 15, also seen most clearly with reference to Figure 2, positioned in the bottom of the cylindrical member 2 and filled with fluid provides the means by which the source of vaporizable fluid is replenished. That is, once every rotational cycle the wicking 14 positioned within the radially extending hole 13 comes into contact with the fluid in the reservoir 15 and fluid flows, by capillary action, through the wick 14 into the lining 12 positioned within the passage 11. In this manner the water supply in the passage 11 is continuously replenished to provide an adequate source of vapor to permit the humidification of those portions of the gaseous medium within the passage 11.

Positioned within the housing 2 of the humidifier 1 is a heating means which functions to elevate the temperature within the humidifying device so that the gaseous medium upon passage through this element has its temperature elevated as well as having selected portions thereof humidified so as to be brought to a saturated condition. To this end there is provided a heating element 16 positioned in an axially extending heater well in the cylindrical member 7. The heating element is connected by means of the lead wires 17 extending through the end plate 3, to a source of energizing voltage, not shown. Thus, the heating element 16 provides a continuous supply of energy to maintain the temperature within the humidifier at a value higher than the ambient temperature of the incoming gaseous medium.

Coupled to the output of the humidifying device is a means to form droplet clouds about any nuclei present in the selected portions of the gaseous medium which have been brought to a saturated condition. This is achieved by subjecting the gaseous medium emitted from the humidified element 2 to a fixed temperature differential. The humidified portions which are at a saturated condition at the elevated temperature upon the sudden cooling are driven to a supersaturated condition, thus triggering off a condensation mechanism which forms droplet clouds about condensation nuclei present in this selected portion. The non-saturated portions, on the other hand, are unaffected by the sudden drop in temperature and no droplet clouds are formed. Thus, periodic droplet clouds are formed in the gaseous medium exiting from the humidifying element 1.

To achieve the above results there is provided a condenser element 19 having a multiplicity of finned heat transfer surfaces 20. The heat transfer surfaces 20 of the condenser 19 establish the necessary temperature differential between the condenser 19 and the humidifier 1. The temperature differential may be maintained by immersing the condenser in a heat removing cooling fluid such as water, which for the sake of clarity is not illustrated. Any number of other well known expedients may be utilized in order to maintain the desired temperature differential.

Connected to the output of the condensing element 19 is an optical chamber 21 wherein the density of the droplet clouds may be detected to produce a periodic electrical signal indicative of the number of nuclei present in the gaseous medium. The chamber 21 is of cylindrical configuration and is so constructed that a beam of radiant energy traverses the chamber, which beam is periodically scattered by the droplet clouds to produce an electrical output signal. The beam of radiant energy is provided by an incandescent lamp 22, or any other similar source of radiant energy, positioned adjacent to one end of the optical chamber 21. A pair of condensing lens elements 24 are mounted in the end of the chamber adjacent to the source of incandescent light.

At the opposite end of the chamber 21 a transparent window element 27 is positioned in the field of view of a radiation sensitive device 30 which may be a phototube or a photomultiplier tube. Positioned intermediate to the lens system 24 and the transparent window 27 and at the focal point of the lens system 24 is a circular shaped barrier 28 having a small central aperture 29.

The optical system within the chamber 21 is so designed that no light impinges upon the radiation sensitive device 30 in the absence of a cloud of droplets. An opaque light barrier 26 is fastened to one of the lens elements 24 and is so positioned that no direct light path from the incandescent lamp 22 through the optical chamber exists. That is, there is produced a cone of light subtending an angle $a$ as illustrated in Figure 1. However, due to the light barrier 26 and the intermediate barrier 28 there is produced within the cone of light $a$ a cone of darkness subtending an angle $b$ which is smaller than the cone angle $a$ and which is also shown in Figure 1. The transparent window 27 is positioned so as to lie within the cone of darkness and, as a consequence, no light impinges on the radiation sensitive device 30 in the absence of a cloud of droplets. Upon the occurrence of a cloud of droplets within the chamber the cone of light in $a$ is scattered in such a manner that some of it impinges upon the radiation sensitive device 30. The amount of scattering, and consequently the magnitude of the output signal from the radiation sensitive device, is a function of the number of droplets present which, in turn, depend on the number of condensation nuclei.

The radiation sensitive device 30 positioned adjacent to the transparent window 27 intercepts the scattered light and produces a periodically varying electromotive force in response thereto. The magnitude of this varying signal is a function of the number of condensation nuclei present. The output of the radiation sensitive device 30 is connected, by means of a resistance-capacitance coupling circuit comprising a capacitance 31 and a resistance 32, to the input terminal of an alternating current amplifier 33. The output of the amplifier 33 is connected by means of leads 34 to an indicating instrument 35 which measures the magnitude of the signal from the radiation sensitive device. The indicating instrument 35, which may be a voltmeter, may then be calibrated directly in terms of condensation nuclei concentrations.

In the embodiment of the invention illustrated in Figure 1 the operating sequence to produce periodic cloud droplets may be described as follows: One of the flow-directing axially extending passages 10 comes into alignment with the conduits 5 and 6. A sample of the nuclei bearing gaseous medium enters the passage 10 and comes into contact with the walls thereof. Upon the rotation of the cylindrical member 7 the passage 10 passes out of alignment with the input and output conduits. The gaseous sample contained within that passage is elevated in temperature due to the presence of the heating element 16 within the humidifier. However, since there is no source of vaporizable fluid within the passage 10 the absolute vapor pressure of that sample remains the same and the same is not brought to a saturated condition.

As the passageway 10 continues to rotate it comes, upon completion of one full cycle of operation, once again into alignment with the conduits 5 and 6. Upon this occurrence the heated sample of the gaseous medium in the passage 10 is ejected and flows through the output conduit 6 into the condenser element. Since this sample of the gaseous medium is not at a saturated condition the temperature differential to which it is subjected in the condenser element 19 does not cause the formation of cloud droplets therein and, as a consequence, upon passing into the optical chamber no light is scattered and no electrical output signal is produced.

However, when the passageway 11 comes into alignment with the input and output conduits, a portion of the gaseous medium enters this passageway. Upon further rotation the passage 11 moves out of alignment with the conduits and the gaseous medium positioned therein is maintained in contact with the source of vaporizable material represented by the moist lining 12. Thus, this sample is subjected to a rise in temperature due to the presence of the heating element 16 while simultaneously maintained in continuous contact with relatively unlimited supply of vaporizable fluid. As a consequence, the selected portion of the gaseous medium within the passage 11 proceeds to absorb vapor from the lining 12 until it reaches a saturated condition for the given temperature within the humidifier (i.e., 100% relative humidity).

As the passage 11 once more comes into alignment with the conduits 5 and 6, at the termination of one rotational cycle, the now saturated portion of the gaseous medium is conducted through the output conduit 6 into the condenser element 19. The saturated sample, upon being subjected to the sudden drop in temperature present by virtue of the condenser 19, quickly attains a supersaturated condition which triggers off the condensation mechanism and forms clouds of water droplets about the condensation nuclei present. This droplet cloud enters the optical chamber 21 and causes scattering of the beam of radiant energy to produce in the output of the radiation sensitive device 30 a periodic signal whose amplitude is an index of the number of condensation nuclei present.

Thus, it can be seen that the humidifying element 1 operates to bring selected portions of the gaseous medium passing therethrough to a saturated condition; i.e., those portions passing through the passage 11, whereas the remaining portion of the gaseous medium is not saturated upon issuing from the humidifying element. Consequently, the periodic formation of droplet clouds, which are detected by means of the optical system, occurs by subjecting the gaseous medium, including the selected portions, to a temperature differential.

In the embodiment of the invention illustrated in Figure 1, the humidifying means consists of a multiplicity of passageways sequentially brought into alignment with input and output conduits, only one of which contains a source of vaporizable material. It is also possible, in an alternative embodiment, to use a humidifier having but a single flow-directing passage therein.

Referring now to Figure 3 there is illustrated an alternative embodiment of a humidifying element which may be utilized in place of the one illustrated in Figure 1. This humidifier of Figure 3 has a non-linear flow-directing passage on one of its elements and a source of vaporizable fluid which is moved through the relative movement of the humidifier elements relative to the flow-directing passage in such a fashion that a selected portion of the gaseous medium flowing therethrough is maintained in continuous contact therewith and, consequently, brought to a saturated condition.

The humidifier 40 of Figure 3 is constituted of a hollow cylindrical member 43 which, in conjunction with a pair of end plates 44 and 45, forms an internal chamber portion. A pair of conduits 41 and 42 constitute the input and output conduits to the humidifier 40. The cylindrical member 43 is maintained in sliding relation with cylindrical flanged portions 46 on the end plates 44 and 45. A sliding packing seal 47 is positioned between the shoulder of the flange portions 46 and the cylindrical member 43 in order to maintain these elements leak-proof in spite of relative rotation therebetween. Positioned circumferentially around the cylindrical member 43 is a toothed gear portion 48 which, in conjunction with a driving gear 49, constitutes the means for rotating the cylinder 43. The gear 49 may, in turn, be driven from a motor of the type illustrated in Figure 1.

There is also provided a source of vaporizable fluid which is maintained in continuous contact with a selected portion of the gaseous medium flowing through the humidifying element. To achieve this result there is provided an axially extending grooved or slotted member 50 within the cylindrical portion 43 which is filled with a moistened wicking material, such as blotter or linen, and acts as the source of vaporizable fluid. Upon rotation of the outer cylindrical member 43, the vaporizable fluid containing groove 50 is rotated and maintained in continuous contact with a non-linear flow-directing groove in a manner to be described.

Positioned within the hollow chamber formed by the cylindrical member 43 and the end plates 44 and 45, is a fixed cylindrical member 51 fastened to the stationary end plates and having a non-linear flow-directing element on the surface thereof. The non-linear flow-directing element consists of a cylindrical member 51 having a groove 52 of helical configuration, the length of which is equal to one coil of a helix and extends from one end of the cylindrical member 51 to the other. The gaseous medium entering the humidifier 40 through the input conduit 41 passes through the helical groove 52 until it reaches the output conduit 42. Upon rotational movement of the outer cylinder 43 and the groove 50 positioned therein, it is clear that there will be an apparent motion of the source of vaporizable fluid along the helical groove 52. If the apparent motion of the source of vaporizable material along the helical groove is of the same velocity as the average velocity of the gaseous medium therethrough, it is obvious that the portion of the gaseous medium which finds itself in contact with the groove 50 remains in contact with the source of vaporizable material throughout its entire passage through the humidifying element.

That is, when the fluid retaining groove 50 is in juxtaposition with the end of the helical groove 52 opposite to the conduit 41, the portion of the gaseous medium entering the helical groove 52 at that instant finds itself in contact with the source of vaporizable fluid. As has been pointed out previously, the rotational speed of the outer cylindrical member 43 and the groove 50 contained therein is controlled in such a manner that apparent motion of the vaporizable fluid is the same as the average velocity of the gaseous medium. Consequently, this portion is maintained in continuous contact with the source of vaporizable fluid.

The portion of the gaseous medium entering the helical groove 52 immediately after the passage of the fluid retaining groove 50 never, in its passage through groove 52, comes into contact with the source of fluid since it moves along the helical flow-directing groove at the same velocity and hence can never catch up. All subsequent portions of the gaseous medium similarly pass through the helical groove without contacting the source of fluid until the groove 50 has gone through one complete revolution and once again comes into juxtaposition with the end of the groove 52 opposite the conduit 41 and the cycle of operation repeats. Thus for every rotational cycle of the cylindrical member 43, one portion of the gaseous medium is maintained in continuous contact with a source of vaporizable fluid whereas the remaining portion of the gaseous medium passing through in the course of one operational cycle is not exposed to moisture.

Since the cylinders are maintained at an elevated temperature due to the presence of a heating element 53 within the cylindrical member 51, the gaseous medium maintained in contact with the vaporizable fluid is brought to a saturated condition; i.e., 100% relative humidity, at the new temperature, whereas the remaining portion of the gaseous medium although elevated in temperature is not humidified. Thus, for each operational cycle of the outer cylindrical member 43 there appears in the output conduit a selected portion of the gaseous medium at saturation while the remaining portion is unhumidified. The output conduit is, in a manner similar to that described with reference to Figure 1, connected to a condensing element to produce periodic clouds of droplets.

From the foregoing description it can be appreciated that the instant invention provides a simple but effective detecting mechanism for condensation nuclei, one wherein a fixed temperature differential is utilized to initiate the condensation mechanism. In addition, a humidifying element particularly adaptable to a detecting apparatus of this type has been provided which brings selected portions of a gaseous medium passing therethrough to a saturated condition.

While particular embodiments of this invention have been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a condensation nuclei detecting device, the combination comprising humidifying means adapted to receive a nuclei bearing gaseous stream and to saturate selected portions of said stream, said humidifying means comprising two relatively rotatable members, one of said members including flow-directing passage means for said stream, a source of vaporizable fluid positioned in one of said members, means to saturate selected portions of said stream by injecting vapor from said source, means to heat said humidifying means to raise the temperature of the stream passing therethrough, heat exchange means coupled to said humidifying means to cool the gaseous stream passing therethrough whereby the saturated selected portions of said stream become supersaturated and droplet clouds form about nuclei in said saturated selected portions and the remaining unsaturated portions of said stream are insufficiently cooled to form droplets about nuclei present therein, and means to detect the density of said clouds.

2. In a condensation nuclei detecting device, the combination comprising means adapted to bring selected portions of a nuclei bearing gaseous medium to a saturated condition comprising a hollow cylindrical member having input and output conduits, a rotating cylindrical member positioned within said hollow member and including a plurality of passages adapted to come into periodic alignment with said input and output conduits, at least one of said passages containing a source of vaporizable fluid maintained in continuous contact with said selected portions, heat exchange means coupled to said output conduit to cool the nuclei bearing gaseous medium whereby the saturated selected portions become supersaturated and droplet clouds form about nuclei in said selected portions and the remaining unsaturated portions of said medium are insufficiently cooled to form droplets about nuclei present therein, and means to indicate the density of said clouds.

3. In a condensation nuclei detecting device, the combination comprising a humidifying means to saturate selected portions of a nuclei bearing gaseous medium comprising two relatively rotatable members, one of said members containing a flow-directing passage for said gaseous medium and the other of said members containing a source of vaporizable fluid, and means to maintain said vaporizable fluid in continuous contact with selected portions of said gaseous medium to produce alternate saturated and unsaturated portions of said gaseous medium at the output of said humidifying means, heat exchange means to cool the gaseous medium whereby the saturated selected portion becomes supersaturated and droplet clouds form about nuclei in said selected portion and unsaturated portions of said gaseous medium are insufficiently cooled to form droplets about nuclei present therein, and means to indicate the density of said clouds.

4. In a condensation nuclei detecting device, the combination comprising a first cylindrical member having a non-linear flow-directing passage for a nuclei bearing gaseous stream, a rotatable hollow cylindrical member surrounding said first cylindrical member and including a source of vaporizable fluid maintained in contact with selected portions of said gaseous stream whereby alternate portions of said stream are saturated, heat exchange means to cool the stream whereby the saturated portions become supersaturated and droplet clouds form about nuclei in said saturated selected portions and unsaturated portions of said stream are insufficiently cooled to form droplets about nuclei present therein, and means to detect the density of said clouds.

5. The apparatus of claim 4 wherein said non-linear passage is of helical configuration.

6. A gas saturation apparatus comprising in combination, input and output conduits, means to transmit gas from said input conduit to said output conduit, said means including a source of vaporizable fluid and means to maintain selected portions of the gas stream in continuous contact with said source of vaporizable fluid as it flows between said conduits whereby said gas stream in said output conduit has alternate saturated and unsaturated portions.

7. Apparatus for humidifying selected portions of a gas stream comprising a chamber defining means adapted to have a gaseous stream flowing therethrough, means positioned within said chamber to define a flow-directing passage means for said stream, said chamber means and said flow directing means being relatively movable, a source of vaporizable fluid in one of said means, and means to maintain said source in continuous contact with selected portions of said gas stream whereby said stream emitted from said apparatus contains alternated saturated and unsaturated portions.

8. A selective humidifier for a gas stream comprising a hollow chamber defining member having input and output conduits, a rotatable member positioned within said chamber including a multiplicity of flow-directing passages adapted to come into periodic alignment with said input and output conduits, at least one of said passages including a source of vaporizable fluid, and means to maintain selected portions of said gas stream in continuous contact with the source of vaporizable fluid as it flows between said conduits to produce alternately saturated and unsaturated portions in said output conduit.

9. In combination, an input conduit, an output conduit, a humidifying apparatus between said conduits, said apparatus comprising a flow passage continuously connected between said conduits to carry gas from one to the other, a source of vaporizable fluid and means to emit vapor into the gas in said passage at spaced points, and means to move said points in unison along said passage at substantially the rate at which gas flows therethrough to maintain selected portions of the gas stream in continuous contact with the source of vaporizable fluid whereby the gas in said output conduit has alternate humidified and unhumidified portions.

References Cited in the file of this patent

UNITED STATES PATENTS

| 2,033,466 | Grant | Mar. 10, 1936 |
| 2,299,457 | Cahusac | Oct. 20, 1942 |
| 2,684,008 | Vonnegut | July 20, 1954 |

FOREIGN PATENTS

| 406,648 | Great Britain | Feb. 26, 1934 |

OTHER REFERENCES

"Cloud Chamber for Counting Nuclei in Aerosols," by Bernard G. Saunders. Review of Scientific Instruments, volume 27, Number 5. Pages 273 through 277 are pertinent.